United States Patent
Husain et al.

(10) Patent No.: US 7,118,672 B2
(45) Date of Patent: Oct. 10, 2006

(54) MEMBRANE SUPPORTED BIOREACTOR FOR MUNICIPAL AND INDUSTRIAL WASTEWATER TREATMENT

(75) Inventors: Hidayat Husain, Brampton (CA); Pierre Lucien Cote, Dundas (CA)

(73) Assignee: Zenon Technology Partnership, Wilmington, DE (US)

(*) Notice: Subject to any disclaimer, the term of this patent is extended or adjusted under 35 U.S.C. 154(b) by 166 days.

(21) Appl. No.: 10/777,204

(22) Filed: Feb. 13, 2004

(65) Prior Publication Data
US 2004/0211723 A1 Oct. 28, 2004

Related U.S. Application Data

(60) Provisional application No. 60/447,025, filed on Feb. 13, 2003.

(51) Int. Cl.
*C02F 3/00* (2006.01)
(52) U.S. Cl. .................... 210/220; 261/23.1; 261/43; 261/124
(58) Field of Classification Search ................ 210/220; 261/23.1, 43, 124
See application file for complete search history.

(56) References Cited

U.S. PATENT DOCUMENTS

| | | | |
|---|---|---|---|
| 2,458,163 A | 1/1949 | Hays | |
| 4,126,544 A | 11/1978 | Baensch et al. | |
| 4,181,604 A | 1/1980 | Onishi et al. | |
| 4,328,102 A | 5/1982 | Bellhouse et al. | |
| 4,416,993 A | 11/1983 | McKeown | |
| 4,664,681 A | 5/1987 | Anazawa et al. | |
| 4,746,435 A | 5/1988 | Onishi et al. | |
| 4,883,594 A | 11/1989 | Sekoulov et al. | |
| 5,015,421 A | 5/1991 | Messner | |
| 5,034,164 A | 7/1991 | Semmens | |
| 5,043,140 A * | 8/1991 | Combs ........................ 422/46 |
| 5,116,506 A | 5/1992 | Williamson et al. | |
| 5,126,050 A | 6/1992 | Irvine et al. | |
| 5,149,649 A | 9/1992 | Miyamori et al. | |
| 5,238,562 A | 8/1993 | Rogut | |
| 5,482,859 A | 1/1996 | Biller | |
| 5,486,475 A | 1/1996 | Kramer et al. | |
| 5,518,620 A | 5/1996 | Eguchi et al. | |
| 5,520,812 A | 5/1996 | Ryhiner et al. | |
| 5,543,039 A | 8/1996 | Odegaard | |
| 5,716,689 A | 2/1998 | Rogut | |
| 5,945,002 A | 8/1999 | Leukes et al. | |
| 6,001,585 A | 12/1999 | Gramer | |
| 6,013,511 A | 1/2000 | Diels et al. | |

(Continued)

FOREIGN PATENT DOCUMENTS

CA 1096976 3/1981

(Continued)

OTHER PUBLICATIONS

Dr. Michael J. Semmens and Denise Hanus, "Studies of a Membrane Aerated Bioreactor for Wastewater Treatment", Cranfield University, Jun. 1999.

(Continued)

*Primary Examiner*—Chester T. Barry
(74) *Attorney, Agent, or Firm*—Bereskin & Parr (57) ABSTRACT

A membrane supported biofilm reactor uses modules having fine, dense, non-porous hollow fibers made from Polymethyl pentene (PMP) formed into a fabric with the PMP as the weft. One or more sheets of the fabric are potted into a module to enable oxygen containing gas to be supplied to the lumens of the hollow fibers. Various reactors using such modules are described.

9 Claims, 6 Drawing Sheets

U.S. PATENT DOCUMENTS

| | | |
|---|---|---|
| 6,183,643 B1 | 2/2001 | Goodley |
| 6,209,855 B1 | 4/2001 | Glassford |
| 6,241,867 B1 | 6/2001 | Mir |
| 6,309,550 B1 | 10/2001 | Iversen et al. |
| 6,354,444 B1 | 3/2002 | Mahendran et al. |
| 6,361,695 B1 | 3/2002 | Husain et al. |
| 6,387,262 B1 | 5/2002 | Rittmann et al. |
| 6,531,062 B1 | 3/2003 | Whitehill |
| 6,558,549 B1 | 5/2003 | Cote et al. |
| 6,592,759 B1 | 7/2003 | Rabie et al. |
| 6,685,832 B1 | 2/2004 | Mahendran et al. |
| 2001/0037967 A1 | 11/2001 | Rabie et al. |
| 2002/0020666 A1 | 2/2002 | Cote et al. |
| 2003/0104192 A1 | 6/2003 | Hester et al. |
| 2004/0060442 A1* | 4/2004 | Nakahara et al. ............ 96/8 |
| 2004/0115782 A1 | 6/2004 | Paterek |

FOREIGN PATENT DOCUMENTS

| | | |
|---|---|---|
| CA | 2005959 | 6/1990 |
| CA | 2100002 | 2/1994 |
| CA | 2102156 | 7/1994 |
| CA | 2182915 | 2/1997 |
| CA | 2356316 | 8/2000 |
| CA | 2300719 | 9/2001 |
| DE | 3544382 | 6/1987 |
| DE | 3730797 A * | 3/1989 |
| DE | 4440464 | 6/1996 |
| EP | 0 049 954 | 4/1982 |
| JP | 54-21057 | 2/1979 |
| WO | WO87/03615 | 6/1987 |

OTHER PUBLICATIONS

Brindle et al., Nitrification and Oxygen Utilisation in a Membrane Aeration Bioreactor, Journal of Membrane Science, 1998.

Cote et al., "Bubble-free Aeration Using Membranes: Process Analysis", Journal Water Pollution Control Federation, Nov. 1998.

Cote et al., "Bubble-free Aeration Using Membranes: Mass Transfer Analysis", Journal of Membrane Science, 1989.

Yeh, Show-Jong and Charles R. Jenkins, "Pure Oxygen Fixed Film Reactor", Journal of the Environmental Engineering Division, Aug. 1978, pp. 611-623.

Woolard, C.R., "The Advantages of Periodically Operated Biofilm Reactors for the Treatment of Highly Variable Wastewater", Wat. Sci. Tech. vol. 35, No. 1, pp. 199-206, 1997.

Twarowska-Schmidt, Krystyna and Andrzej Wlochowicz, "Melt-spun Asymmetric Poly(4-methyl-1-pentene) Hollow Fibre Membranes", Journal of Membrane Science 137 (1997) 55-61.

Yamagiwa et al., "Simultaneous Organic Carbon Removal and Nitrification by Biofilm Formed on Oxygen Enrichment Membrane", Journal of Chemical Engineering of Japan, Oct. 27, (1994) 638-643.

Casey et al., "Review of Membrane Aerated Biofilm Reactors", Resources, Conservation and Recycling 27 (1999) 203-215.

* cited by examiner

FIGURE 1: PMP Textile Fibre

FIGURE 2: Fabric Element (plan view of element oriented as in Figure 4)

FIGURE 3: Module Configuration

FIGURE 4: Experimental Module

FIGURE 5: COD Reduction in a Membrane Supported Biofilm

MEMBRANE SUPPORTED BIOREACTOR FOR MUNICIPAL AND INDUSTRIAL WASTEWATER TREATMENT

This is an application claiming the benefit under 35 USC 119(e) of U.S. Provisional Application Ser. No. 60/447,025, filed Feb. 13, 2003. All of U.S. Ser. No. 60/447,025 is incorporated herein by this reference to it.

FIELD OF THE INVENTION

This invention relates to wastewater treatment and, more particularly, to a method and system for the treatment of wastewater, for example industrial or municipal wastewater.

BACKGROUND OF THE INVENTION

Currently, most wastewater treatment plants use an activated sludge process, based on biological oxidation of organic contaminants in a suspended growth medium. Oxygen is supplied from air using bubble type aerators. Efficiency of these systems is poor resulting in very high energy use. Tank size is large as chemical oxygen demand loadings are low because of low biomass concentration. The result is high capital and operating cost.

A second type of established biological oxidation process uses biofilms grown on a media. The wastewater is circulated to the top of the reactor and trickles down. Air is supplied at the bottom. The rate of oxygen transfer is limited by the biofilm surface area, and the operating cost is high because of wastewater pumping requirements. Other versions of this process are also available, but all of these result in high operating costs.

Recently, development work has been done on a membrane supported bioreactor concept. This process involves growing biofilm on the surface of a permeable membrane. Oxygen containing gas is supplied on one side of the membrane and the biofilm is grown on the other side, which is exposed to the substrate. Oxygen transferred through the membrane is absorbed by the biofilm as it is available in the form of very fine bubbles. This type of process has not become commercially viable.

SUMMARY OF THE INVENTION

It is an object of this invention to improve on the prior art. It is another object of this invention to provide methods and apparatus suitable for treating water, for example industrial and municipal wastewater, using membrane supported bioreactor technology. It is another object of this invention to provide a hollow fibre membrane and module and to use them in a membrane supported biofilm reactor. The inventors have observed that a membrane and module with a high gas transfer rate and adequate surface area would allow a membrane supported biofilm reactor to provide an operating cost advantage over other processes used in the art. For example, a savings in operating cost may be achieved using a membrane with an oxygen transfer efficiency (OTE) of over 50% or in the range of 50% to 70% or more. The inventors have also observed that a module of hollow fibre membranes may provide a large surface area but that commercially available hollow fibre membranes tend to wet which results in a drastic drop in their oxygen transfer rates.

In one aspect, this invention provides a very fine dense hollow fibre made from polymethyl pentene (PMP), which has a high selectivity and diffusion coefficient for oxygen. Use of very small diameter fibre helps reduce module cost as established textile fine fibre technology can be used. A very large surface area can be provided to achieve high OTE.

In another aspect, this invention provides a fabric with a very large number of PMP hollow fibres providing sufficient surface area so that oxygen transfer does not become a limiting factor in controlling biological kinetics. The fabric is made with the PMP fibre as weft and an inert fibre as warp to minimize the damage to the fibre while weaving. The fabric provides strength to the fine fibre to permit biofilm growth on its surface with minimal fibre breakage.

In another aspect, the invention provides a module built from this fabric with very high packing density to permit good substrate velocities across the surface without recirculation of a large volume of liquid. The modules enable oxygen containing gas to be supplied to the lumen of the hollow fibre without exposing it to the wastewater. Long fibre elements are used and potted in the module header to provide a low cost configuration.

In another aspect, this invention uses air as a means of controlling the biofilm thickness to an optimum level. Other methods of biofilm control include in-situ digestion, periodic ozonation followed by digestion, and use of a higher life form, such as worms, to digest the biofilm periodically. To speed up the biological digestion reactions, the air is preheated to raise the temperature of the bioreactor.

In another aspect, this invention provides a plug flow, or multistage continuously stirred tank reactors to conduct biological reactions at high substrate concentrations. This maximizes mass transfer of organic carbon compounds and ammonia in the biofilm, eliminating this process as a potential limitation to reaction rates.

In another aspect, this invention uses oxygen enrichment as a means of dealing with peak flows. Such oxygen enrichment may be determine by on-line COD monitors, or set according to time of day for municipal applications where diurnal flow and strength variations are well known.

In another aspect, this invention uses the module and bioreactor design to conduct other biological reactions on the surface of the fabric. An example is biological reduction of compounds such as sulphates in water using hydrogen gas supplied to the lumen of the hollow fibre.

In another aspect, this invention uses either air or enriched air to supply oxygen. Selection of enriched air and level of oxygen present in such air is determined by the wastewater strength.

In another aspect, this invention uses one or more of the apparatuses described above to digest primary and secondary sludge.

The features of these various embodiments may be combined together in various combinations or sub-combinations. The description above is intended to introduce the reader to aspects of the invention, embodiments of which will be discussed below. In addition to various combinations of features described above, the invention may also involve combinations or sub-combinations of features or steps described above with features or steps described below.

BRIEF DESCRIPTION OF THE DRAWINGS

Embodiments of the invention will be described below with reference to the following figures.

DESCRIPTION OF EMBODIMENTS

Figure 1:
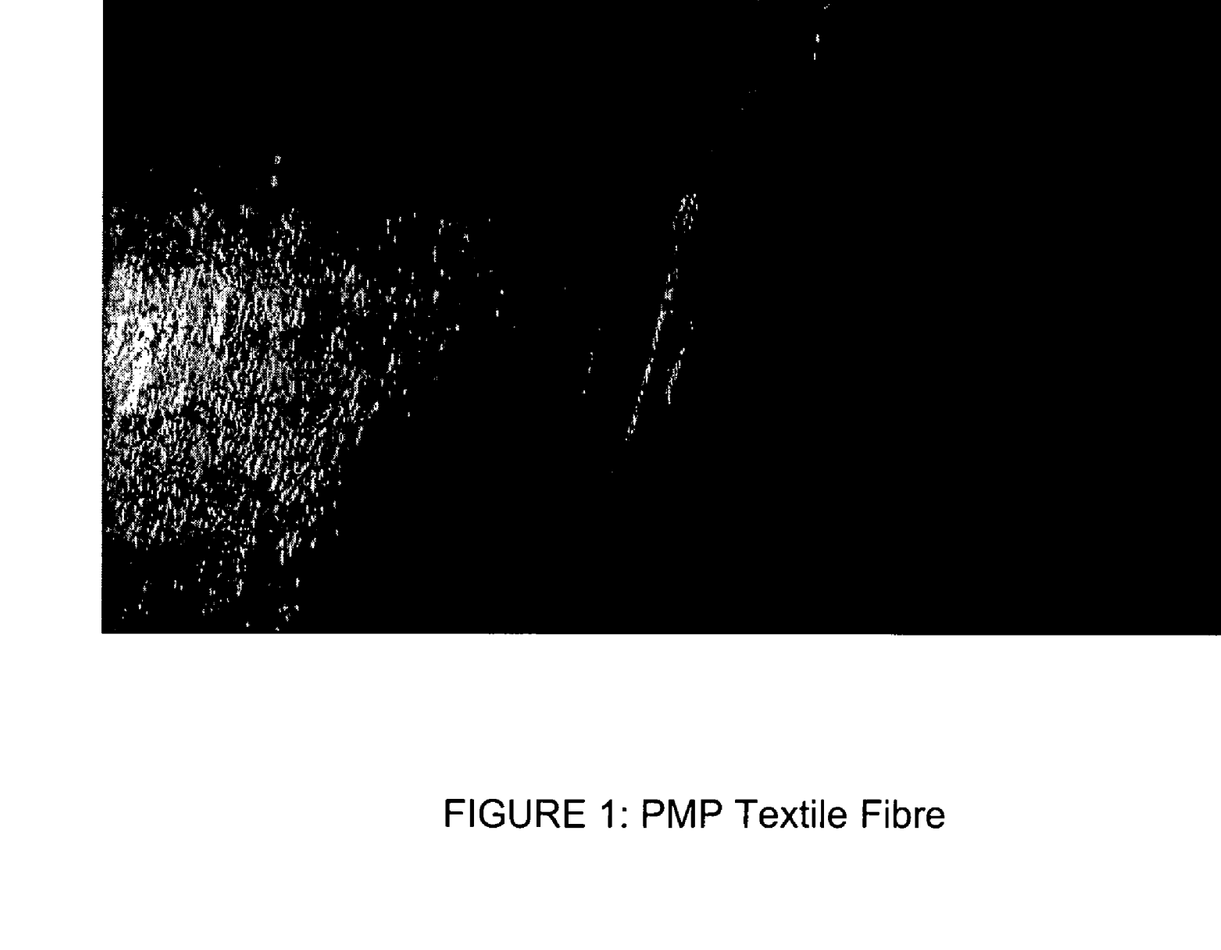
FIG. 1 presents a picture of a fibre.

FIG. 1 shows a textile polymethyl pentene fibre with 45 micron outside diameter and 15 to 30 micron inside diameter. The fibre is made by a melt extrusion process in which the PMP is melted and drawn through an annular spinnerette. The raw polymer used was MX-001, produced by Mitsui Petrochemical. Outside diameters of 30–50 microns may be used. The fibres are hollow inside but non-porous. Oxygen travels through the fibre walls by molecular diffusion.

Figures 2, 3:
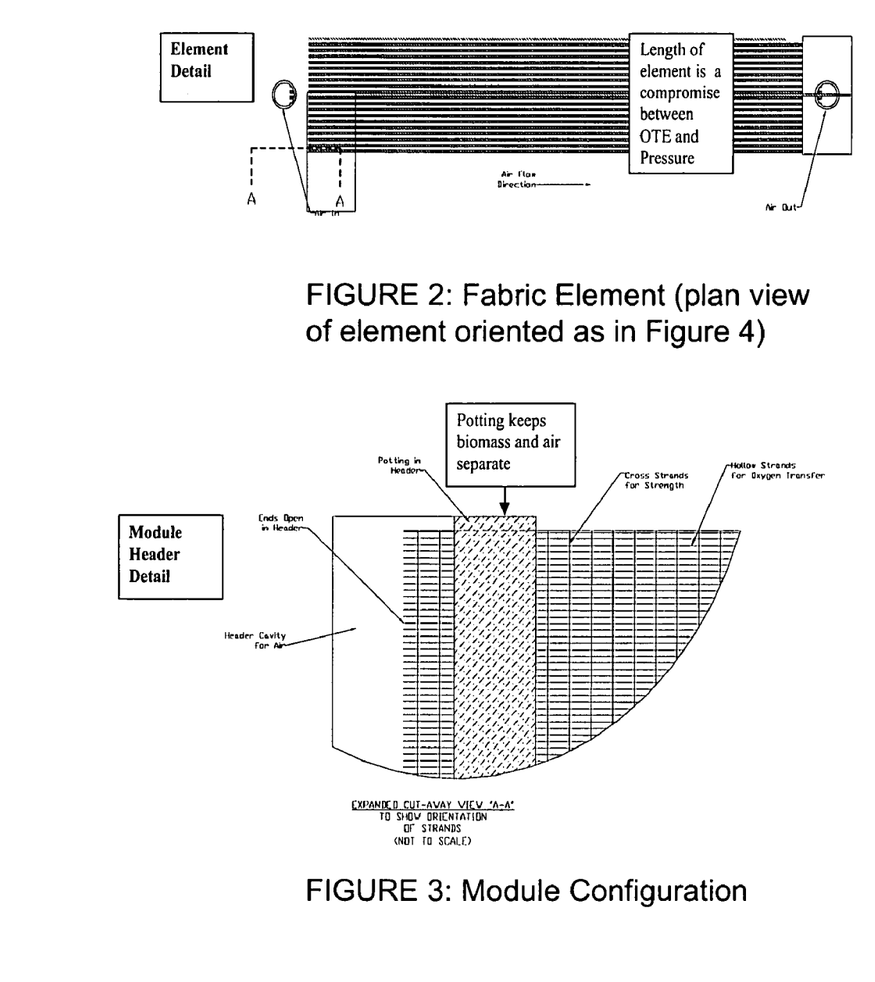
FIG. 2 presents a drawing of a fabric made from the fibre of FIG. 1.
FIG. 3 is a drawing of a module made from the fabric of FIG. 2.

In FIG. 2, the fibre is woven in a fabric, with PMP fibre running horizontally, and an inert fibre running vertically to provide support to the fine PMP fibre. FIG. 3 shows a module, in which a bundle or stack of sheets of fabric are potted at both ends in a header using potting materials such as polyurethane, hot melt or epoxy. A large sheet of the fabric may also be rolled or folded to produce a module rather than using separate sheets. The bundle is assembled together with spacers between the sheets of fabric which provide a gap between the sheets for aeration and substrate flow. These spacers may be plastic strips or hot melt layers. The gap between sheets may range from 3 mm to 15 mm depending on the nature of the wastewater. The length of the module may range from 1 m to 5 m. To produce the module of FIG. 3, a sheet of fibres is laid onto strips of adhesive located to cross the ends of the fibres. Spacing strips were then placed over the sheet, followed by additional strips of adhesive and an additional sheet of fabric. These steps were repeated several times. The resulting assembly was then sealed into a pair of opposed headers such that the lumens of the fibres would be in communication with a port in one or both headers.

Figure 4:
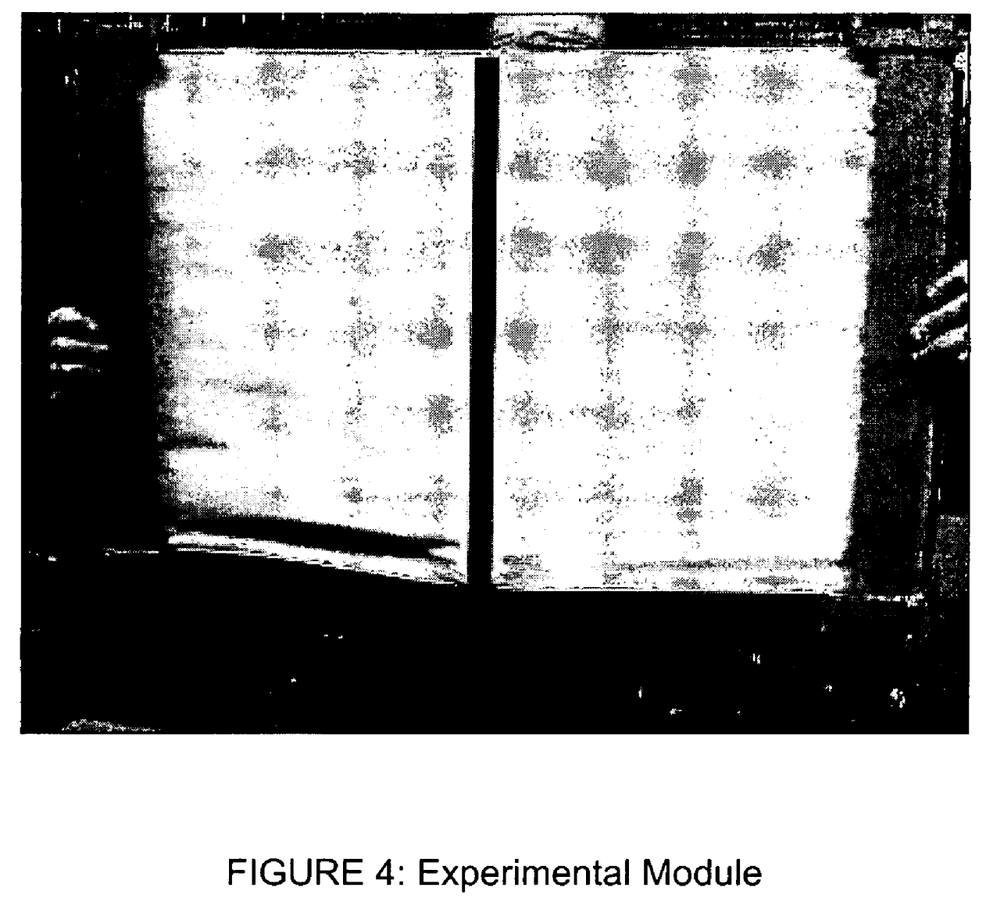
FIG. 4 presents a picture of the module of FIG. 3.

Gas containing oxygen flows into at least one of the headers. The module may be operated in a dead end mode, with no outlet other than through the fibres. Alternately, the module may be operated in a cross flow manner with gas entering through one header, flowing through the membranes then exiting from the other header. The oxygen content and flow rate of the gas may be set to produce an oxygen transfer that provides aerobic conditions near the membranes and anoxic conditions near the substrate being treated. Multiple reactions, including carbon based organics, ammonia and total nitrogen reduction, may be performed in the biofilm, FIG. 4 shows a picture of a module assembled as described above. The headers were about 2 metres apart. Additional spacers were used mid way between the headers to better preserve the sheet separation. A thin steel rod was attached to the edges of the fabric sheet in the right half of the module to address the folding which can be seen in the left half of the Figure.

Reactors similar to those describes in U.S. patent application Ser. No. 09/799,524, filed Mar. 7, 2001, may be used. For example the reactors discussed in an excerpt from U.S. Ser. No. 09/799,524 reproduced below may be used with the present invention. The entire text of U.S. patent application Ser. No. 09/799,524, filed Mar. 7, 2001, is incorporated herein by this reference to it.

In another embodiment of the invention, a biofilm is grown on a fabric woven from textile PMP dense wall hollow fibre. Oxygen bearing gas is introduced into the lumen of the fibre. Aerobic reactions take place at the surface of the fibre, where the highest levels of oxygen exists. These reactions include conversion of organic carbon compounds to carbon dioxide and water, and ammonia to nitrates. The surface of the biofilm is maintained under anoxic conditions such that conversion of nitrates to nitrogen can take place. The result is simultaneous reduction of organic carbon, ammonia and total nitrogen.

In another embodiment, all the above features are used, except that high aeration velocity of 2–8 feet/second is used at the surface of the fabric to reduce the thickness of the biofilm. This is done once every day to once every week. Also, air may be used to periodically mix the contents of the bioreactor.

In another embodiment of the invention, a number of bioreactors are installed in series to provide flow patterns approaching plug flow. This results in higher reaction rates and better utilization of oxygen.

In another embodiment, ozone gas, introduced in the fibre lumen, is used to oxidize a part of the biofilm to make it digestible. Oxygen is then provided to digest the oxidized organics, thereby reducing the total amounts of solids generated.

In another embodiment of the invention, worms are used in an isolated section of the reactor to digest excess biofilm to reduce bio-solids generation. The worms are grown in a separate bioreactor.

In another embodiment of the invention, different oxygen levels are used in different stages of the bioreactor by oxygen spiking to meet different levels of oxygen demand and to achieve high bioreactor loadings.

In another embodiment of the invention, the elements are stacked in a vertical configuration, with flow taking place from top to bottom or bottom to top. This reduces the capital required for aeration and the operating cost of air. Numerous other embodiments may also be made according to the invention.

EXAMPLE

Example 1

Chemical Oxygen Demand (COD) Reduction in a Membrane Supported Bioreactor

Figure 5:
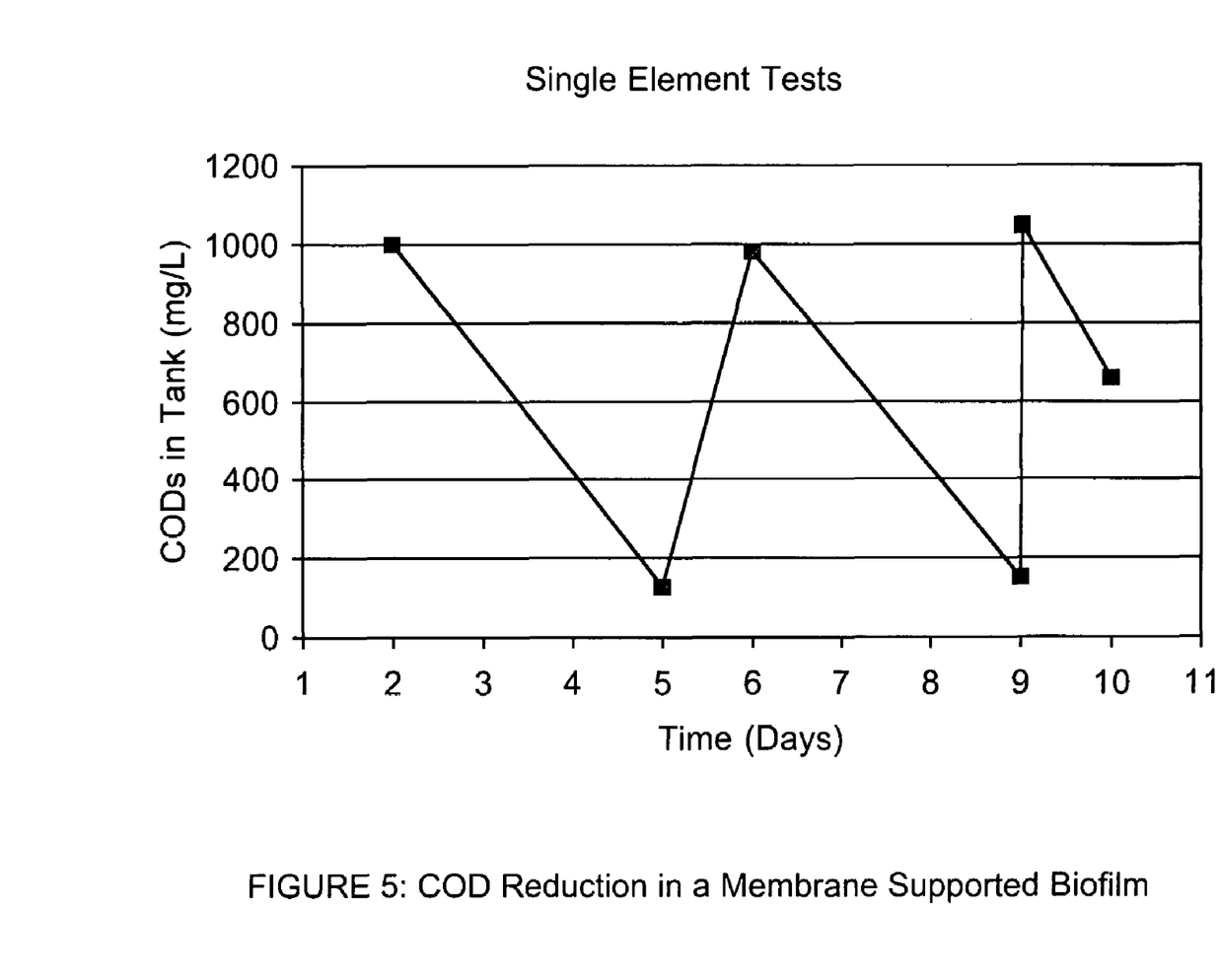
FIG. 5 is a graph of results of tests on the module of FIG. 4.

A bench scale bioreactor was designed using the experimental module presented in FIG. 4. Wastewater with a COD level of 1000 mg/l was introduced in a batch manner at daily intervals. A series of batch reactions were conducted to determine the rate of reaction and oxygen transfer efficiency. FIG. 5 presents the results. It can be seen that 80–90% reduction of COD was obtained. Oxygen transfer efficiency during these series of tests ranged from 50 to 70%, as measured by the exit concentration of air.

Excerpt Form U.S. Ser. No. 09/799,524

Membrane Supported Biofilm Reactors for Wastewater Treatment

Figure 8:
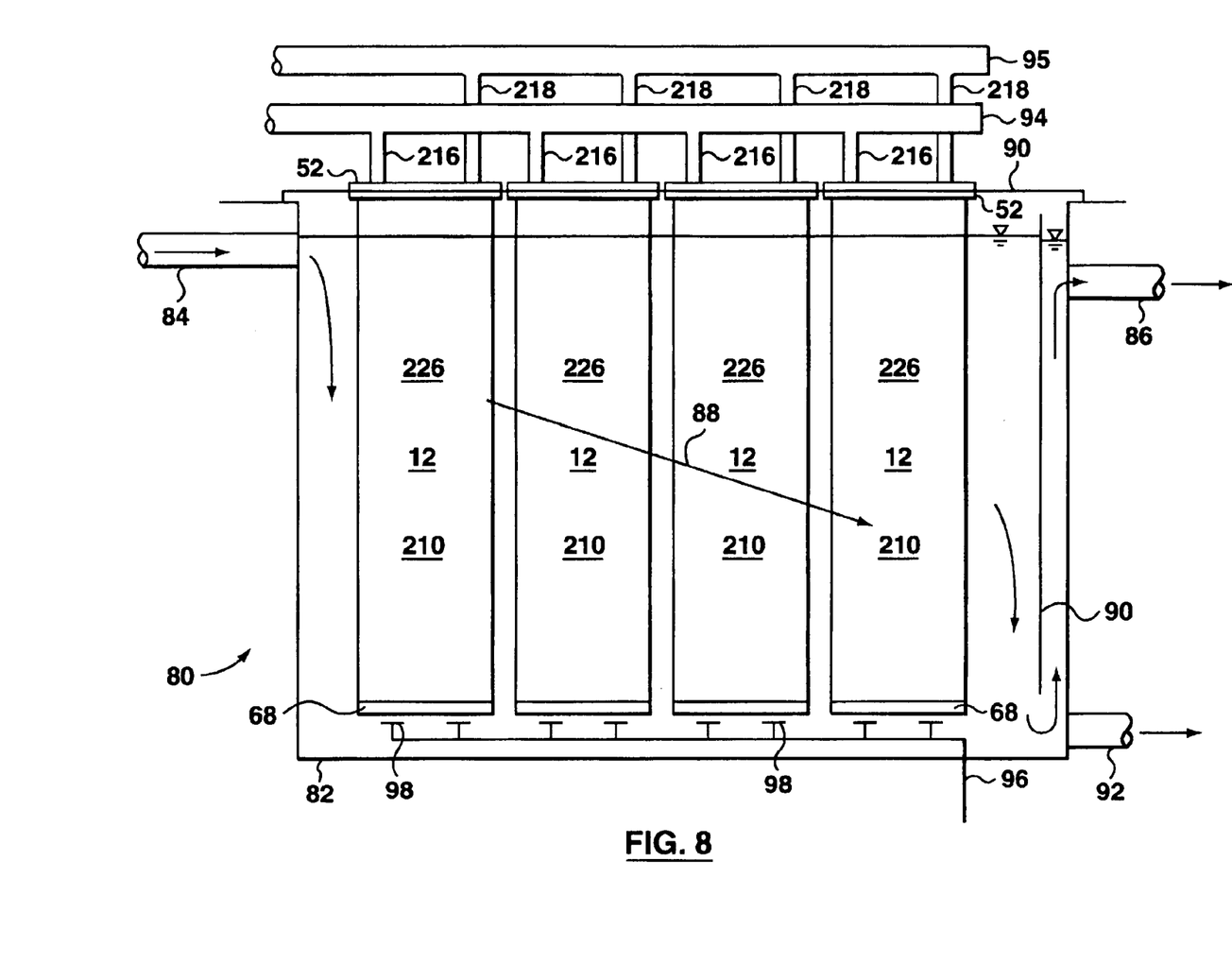
FIGS. 8 and 9 are drawings of reactors excerpted from U.S. Ser. No. 09/799,524.

FIG. 8 shows a reactor 80 having a tank 82, a feed inlet 84 to the tank 82, an effluent outlet 86 from the tank 82, a flow path 88 between the feed inlet 84 and effluent outlet 86 and a plurality of the third apparatus 210. The third apparatus 210 is shown as an example only and the second apparatus 110 or first apparatus 10 may also be used with suitable modifications to the reactor 80.

The planar elements 226 are sized to fit the tank 82 and fill a substantial amount of its volume. The planar elements 226 have no pre-manufactured or rigid frame and thus are preferably custom made to provide efficient use of the available space in the tank 82. For example, planar elements 226 may range from 0.5 m to 2 m wide and 2 to 10 m deep. The planar elements 226 are preferably arranged in the tank 82 in a number of rows, one such row being shown in FIG. 8. The planar elements 226 may range from 0.5 to 2 mm in thickness and adjacent rows are placed in the tank 82 side by side at a distance of 5 to 15 mm to allow for biofilm growth and wastewater flow between adjacent planar elements 226.

The tank 82 is longer than it is deep and it is preferred to encourage a generally horizontal flow path 88 with minimal mixing. This is done by leaving some space near the ends (ie. near the inlet 84 and outlet 86) of the tank 82 for vertical movement of water and leaving minimal free space at the top, bottom and sides of the tank 82. A baffle 90 may also be placed upstream of the effluent outlet 86 to force the flow path 88 to go under it. A sludge outlet 92 is provided to remove excess sludge.

The flow path 88 is generally straight over a substantial portion of the tank 82 between the feed inlet 84 and effluent outlet 86. Each third apparatus 210 is held in the tank 82 by its headers 52 attached to a frame 90 and by its weight 68. The headers 52, frame 90 and weights 68 restrain each third apparatus 210 in positions in the reactor 80 whereby the planar element 226 of each third apparatus 210 are generally parallel to the flow path 88. Preferably, a plurality of planar elements 226 are spaced in series along the flow path 88 so that the reactor 80 will more nearly have plug flow characteristics. Wastewater to be treated may be partially recycled from the effluent outlet 86 to the feed inlet 84. Such a recycle can increase the rate of gas transfer by increasing the velocity of wastewater along the flow path 88, but it is preferred if the recycle ratio is small so as to not provide more nearly mixed flow characteristics in the reactor 80.

Oxygen containing gas is provided to each third apparatus 210 through its inlet conduit 216 connected to an inlet manifold 94 located above the water to be treated. With the inlet manifold 94 located above the water, a leak in any third apparatus 210 will not admit water into the manifold nor any other third apparatus 210. Gas leaves each third apparatus 210 through its outlet conduit 218 which is connected to an exhaust manifold 95. Although it is not strictly necessary to collect the gases leaving each third apparatus 210, it does provide some advantages. For example, the gas in the exhaust manifold 95 may have become rich in volatile organic compounds which may create odour or health problems within a building containing the reactor 80. These gases are preferably treated further or at least vented outside of the building.

Preferably, the gas is provided at a pressure such that no bubbles are formed in the water to be treated and, more preferably, at a pressure of less than 10 kPa. This pressure is exceeded by the pressure of the water to be treated from one meter of depth and beyond. Preferably at least half of the area of the third planar elements 226 is below that depth. The water pressure thus prevents at least one half of the surface of the membranes 12 from ballooning.

Oxygen diffuses through the membranes 12. The amount of oxygen so diffused is preferably such that an aerobic biofilm is cultured adjacent the planar elements 226, an anoxic biofilm is cultivated adjacent the aerobic biofilm and the wastewater to be treated is maintained in an anaerobic state. Such a biofilm provides for simultaneous nitrification and denitrification. A source of agitation 96 is operated from time to time to agitate the planar elements 226 to release accumulated biofilm. A suitable source of agitation is a series of coarse bubble aerators 98 which do not provide sufficient oxygen to the water to be treated to make it non-anaerobic.

Figure 9:
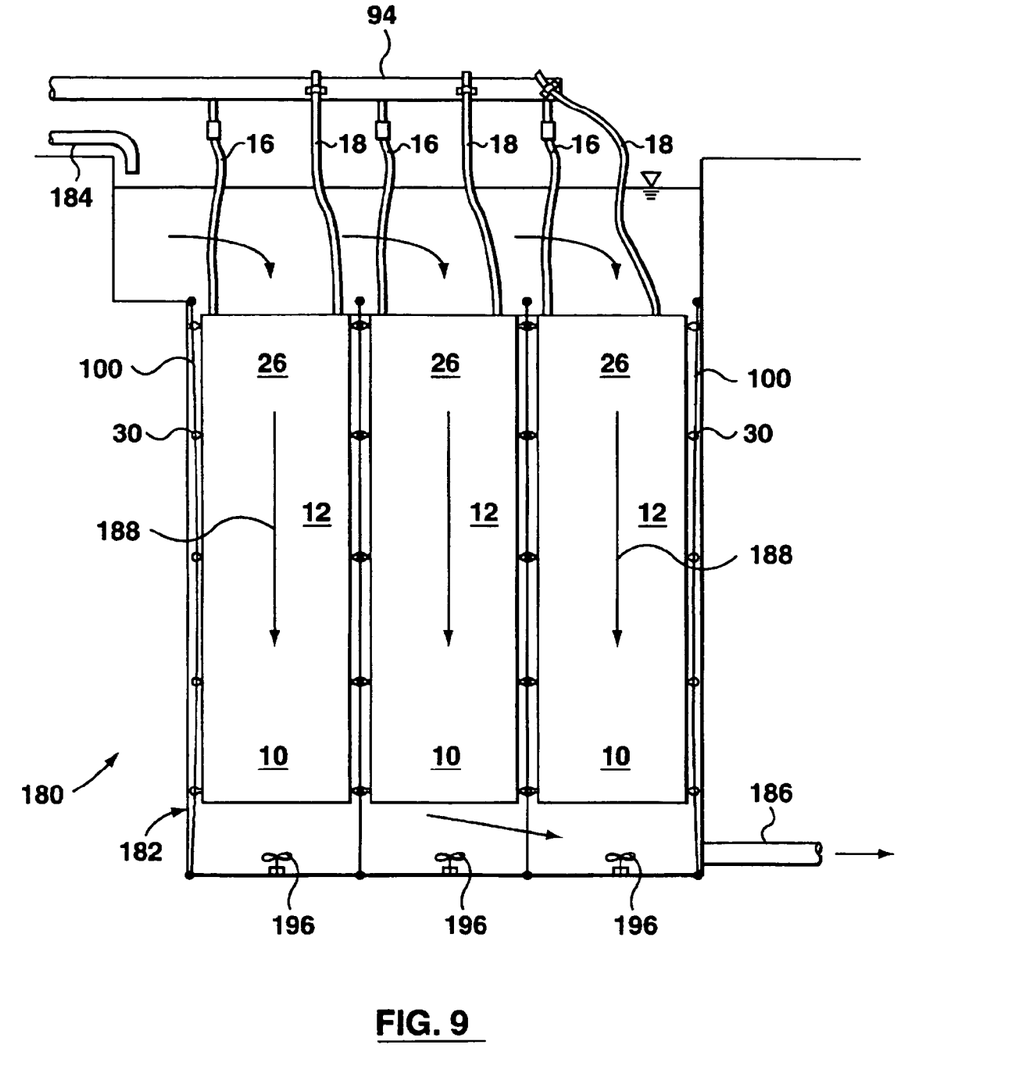

FIG. 9 shows a second reactor 180 having a tank 182, a feed inlet 184, an effluent outlet 186, a flow path 188 and a plurality of the first apparatus 10. The first apparatus 10 is shown as an example only and the second apparatus 110 or third apparatus 210 may also be used with suitable modifications to the second reactor 180.

Each first apparatus 10 is held by its loops 30 wrapped around wires 100 or ropes attached to the tank 182. The loops 30 and wires 100 restrain each first apparatus 10 in a position in the second reactor 180 whereby the planar element 26 of each first apparatus 10 is generally parallel to the flow path 188.

The first planar elements 26 are sized to fit the tank 182 and fill a substantial amount of its volume. Like the third planar elements 226, the first planar elements 26 have no pre-manufactured or rigid frame and are preferably custom made to provide efficient use of the available space in the tank 182. The first planar elements 26 may range from 0.25 to 1 mm in thickness and are placed side by side at a distance of 5 to 15 mm to allow for biofilm growth and wastewater flow between adjacent first planar elements 26.

The tank 182 is deeper than it is long and it is preferred to encourage a straight and generally vertical flow path 188 over a substantial portion of the tank 182 with minimal mixing. This is done by leaving minimal space near the ends and sides of the tank 82 but a substantial amount of space near the top and bottom of the tank 82. Water to be treated may be partially recycled from the effluent outlet 186 to the feed inlet 184 but it is preferred that the recycle rate be small.

Oxygen containing gas is provided to each first apparatus 10 through its inlet conduit 16 connected to a manifold 94 located above the water to be treated. With the inlet manifold 94 located above the water, a leak in any first apparatus 10 will not admit water into the manifold nor any other first apparatus 210. The outlet conduits 18 are clipped in a convenient place, for example to the inlet manifold 94, above the surface of the water to be treated. Preferably, the gas is provided at a pressure of less than 10 kPa and the planar elements 26 are located more than 1 m deep in the tank 182. In this way, the gas pressure is exceeded by the pressure of the water to be treated which prevents the membranes 12 from ballooning. Glue lines (not shown), preferably not effecting more than one half of the area of the planar elements 26, can be used to reinforce part of the planar elements 26 if they can not be mounted deep enough.

Alternatively, gas flow through the first element 10 is produced by applying a suction, preferably of not more than 10 kPa less than atmospheric pressure, to the outlet conduits 18. The inlet conduits 16 are placed in fluid communication with the atmosphere. By this method, the rate of gas diffusion across the membrane 12 is slightly reduced, but no reinforcement of the membrane 12 (for example, by glue lines) is required regardless of the depth of the first element 10.

Oxygen diffuses through the membranes 12 preferably such that an aerobic biofilm is cultured adjacent the planar elements 26, an anoxic biofilm is cultivated adjacent the aerobic biofilm and the wastewater to be treated is maintained in an anaerobic state. A second source of agitation 196 is operated from time to time to agitate the first planar elements 26 to release accumulated biofilm. A suitable source of agitation is a series of mechanical mixers 102.

What is claimed is:

1. An apparatus for supporting a biofilm in a liquid comprising:
   a) a plurality of gas permeable, water impermeable, hollow fibers, each hollow fiber having a lumen, an outer surface and an open end; and,
   b) a header, the header having a cavity and a port open to the cavity,
      wherein the hollow fibers extend from the header, with the outer surfaces of the open ends of the hollow fibers sealed to the header and the lumens of the hollow fibers communicating with the port through the cavity, and
      wherein the hollow fibers extend along their length generally in a first direction and further comprising second fibers extending along their length generally in a second direction, the second direction being perpendicular to the first direction.

2. The apparatus of claim 1 wherein the hollow fibers and second fibers form a fabric.

3. The apparatus of claim 2 wherein the fabric is generally continuous across the length of the hollow fibers.

4. An apparatus for supporting a biofilm in a liquid comprising:
   a) a plurality of gas permeable, water impermeable, hollow fibers, each hollow fiber having a lumen, an outer surface and an open end; and,
   b) a header, the header having a cavity and a port open to the cavity,
      wherein the hollow fibers extend from the header, with the outer surfaces of the open ends of the hollow fibers sealed to the header and the lumens of the hollow fibers communicating with the port through the cavity,
      and wherein the hollow fibers have second open ends, the second open ends of the hollow fibers are potted in a second header, the second open ends communicate with a second port of the second header through a second cavity of the second header and the header and the second header are spaced apart from each other and the hollow fibers are arranged into one or more fabric sheets extending between the headers.

5. The apparatus of claim 4 wherein the fabric sheets are generally parallel to each other.

6. The apparatus of claim 5 wherein adjacent fabric sheets have a spacing between them of between 3 mm and 15 mm.

7. The apparatus of claim 6 further comprising spacers between the fabric sheets outside of the header.

8. The apparatus of claim 4 wherein the fabric sheets are woven.

9. The apparatus of claim 4 having an oxygen transfer efficiency of 50% or more.

\* \* \* \* \*